(12) United States Patent
Aiello et al.

(10) Patent No.: US 6,907,769 B2
(45) Date of Patent: Jun. 21, 2005

(54) APPARATUS AND METHOD FOR DETECTING AIR CONTAMINATION IN FLUID DYNAMIC BEARINGS

(75) Inventors: Anthony Joseph Aiello, Aptos, CA (US); Klaus Dieter Kloeppel, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 289 days.

(21) Appl. No.: 10/113,595

(22) Filed: Mar. 28, 2002

(65) Prior Publication Data

US 2003/0117739 A1 Jun. 26, 2003

Related U.S. Application Data

(60) Provisional application No. 60/342,605, filed on Dec. 20, 2001.

(51) Int. Cl.[7] .................................................. G01M 3/02
(52) U.S. Cl. ............................................ 73/37; 73/10
(58) Field of Search .......................... 73/37, 10, 865.9; 360/75, 37

(56) References Cited

U.S. PATENT DOCUMENTS

| 4,557,610 | A | | 12/1985 | Asada et al. | |
|---|---|---|---|---|---|
| 4,795,275 | A | | 1/1989 | Titcomb et al. | |
| 4,931,887 | A | * | 6/1990 | Hegde et al. | 360/75 |
| 5,246,294 | A | | 9/1993 | Pan | |
| 5,524,986 | A | | 6/1996 | Leuthold et al. | |
| 5,824,920 | A | * | 10/1998 | Sugimoto et al. | 73/865.8 |
| 5,901,013 | A | | 5/1999 | Lee et al. | |
| 6,173,234 | B1 | * | 1/2001 | Lee | 702/50 |
| 6,587,301 | B1 | * | 7/2003 | Smith | 360/75 |
| 6,700,726 | B1 | * | 3/2004 | Gillis et al. | 360/75 |
| 2001/0035960 | A1 | * | 11/2001 | Johnston | 356/507 |
| 2002/0118483 | A1 | * | 8/2002 | Meyer et al. | 360/75 |
| 2003/0021054 | A1 | * | 1/2003 | Feliss et al. | 360/69 |
| 2003/0206357 | A1 | * | 11/2003 | McConnell et al. | 360/31 |

* cited by examiner

*Primary Examiner*—Hezron Williams
*Assistant Examiner*—Nashmiya Fayyaz
(74) *Attorney, Agent, or Firm*—Morrison & Foerster LLP

(57) ABSTRACT

Embodiments of the invention generally provide a method for detecting air contamination within a fluid dynamic bearing used with a disc drive. In one embodiment, the invention provides a method to determine the amount of air contamination with hydrodynamic fluid by comparing the differential displacement of the fluid dynamic bearing between vacuum and non-vacuum conditions. In another aspect, the invention provides an air-contamination detecting apparatus adapted to detect air contamination within the fluid of a fluid dynamic bearing. In another aspect, the invention provides a method to determine air contamination within fluid dynamic bearings using the change in fly height of one or more probes disposed above the surface of a rotating surface of the disc drive.

7 Claims, 4 Drawing Sheets

APPARATUS AND METHOD FOR DETECTING AIR CONTAMINATION IN FLUID DYNAMIC BEARINGS

CROSS-REFERENCE TO A RELATED APPLICATION

This invention is based on U.S. Provisional Patent Application Ser. No. 60/342,605 filed Dec. 20, 2001, entitled "Air Detection Method In Fluid Dynamic Bearings Via Fly Height" filed in the name of Anthony Joseph Aiello and Klaus Dieter Kloeppel. The priority of this provisional application is hereby claimed.

BACKGROUND OF THE INVENTION

1. Field of the Invention

The invention relates generally to the field of disc drives, and more particularly to an apparatus and method for detecting air contamination of fluid dynamic bearings within a disc drive.

2. Description of the Related Art

Disc drives are capable of storing large amounts of digital data in a relatively small area. Disc drives store information on one or more recording media. The recording media conventionally takes the form of a circular storage disc, e.g., media, having a plurality of concentric circular recording tracks. A typical disc drive has one or more discs for storing information. This information is written to and read from the discs using read/write heads mounted on actuator arms that are moved from track to track across surfaces of the discs by an actuator mechanism.

Generally, the discs are mounted on a hub that is turned by a spindle motor to pass the surfaces of the discs under the read/write heads. The spindle motor generally includes a shaft supported from a base plate of the housing. Permanent magnets attached to the hub interact with a stator winding to rotate the hub. One or more bearings usually support the hub for rotation.

Over time, disc drive storage density has tended to increase and the size of the storage system has tended to decrease. This trend has lead to greater precision and lower tolerance in the manufacturing and operating of magnetic storage discs. For example, to achieve increased storage densities the read/write heads must be placed increasingly close to the surface of the storage disc.

From the foregoing discussion, it can be seen that the bearing assembly which supports the storage disc is of critical importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor because of low damping.

One alternative bearing design is a fluid dynamic bearing. In a fluid dynamic bearing, a lubricating fluid such as air or liquid provides a bearing surface between a fixed member of the housing (i.e., shaft) and a rotating member of the disc hub. In addition to air, typical lubricants include oil or ferromagnetic fluids (i.e., hydrodynamic fluid). Fluid dynamic bearings spread the bearing interface over a large surface area in comparison with a ball bearing assembly, which comprises a series of point interfaces. This is desirable because the increased bearing surface reduces wobble or run-out between the rotating and fixed members. Further, the use of fluid in the interface area imparts damping effects to the bearing which helps to reduce non-repeat run-out.

Generally, during the manufacturing of the fluid dynamic bearings using oil or ferromagnetic fluids, the fluid dynamic bearing undergoes a lubricating fluid fill process. During the lubricating fluid fill process, air is inadvertently introduced into the lubricating fluid in the form of bubbles. Unfortunately, the bubbles may cause fluid pressure inconsistencies within the fluid dynamic bearing. Further, during operation, the air bubbles may expand increasing non-repeatable run-out between the rotating and fixed members.

Generally, for non-fluid dynamic bearings, such as stationary shaft and two piece hub-shaft motors, the meniscus of the fluid is checked under a vacuum for changes due to air contamination. That is, a change typically indicates the presence of a bubble, which expands. For example, a microscope may be used to visually check the fluid meniscus change in dimension when a vacuum is applied. If air is present in the non-fluid dynamic bearings, the meniscus width, height, etc., within the capillary may vary as a function of the amount of air present.

Generally, differential weight changes before and after the fill process are used to inspect the air contamination of fluid within a fluid dynamic bearing. Unfortunately, this methodology is time consuming and prone to measurement variation as the amount of air within the hydrodynamic fluid may be very small. Accordingly, the measurements may lead to an increase in disc drive manufacturing time, premature disc drive failure due to inaccurate measurements, and ultimately an increase in the cost of the disc drive.

Therefore, a need exists for a method and apparatus to provide a reliable and repeatable fluid dynamic bearing air-bubble contamination test.

SUMMARY OF THE INVENTION

The invention generally provides a method for detecting air-bubble contamination of fluid dynamic bearings used with a disc drive. In one embodiment, the invention generally provides a method of measuring air-bubble contamination within a fluid dynamic bearing of a disc drive. The method comprises rotating a disc drive motor, then determining at least one first value responsive to air-contamination within the fluid dynamic bearing. At least one second value is then compared to the at least one first value and if the at least one second value exceeds the at least one first value then the method determines if the at least one second value is an unacceptable disc drive operational condition.

In another embodiment, the invention provides a disc drive fluid dynamic bearing air contamination testing apparatus, comprising a vacuum chamber adapted to hold at least one disc drive. The testing apparatus also includes an apparatus adapted to detect change within the hydrodynamic bearing when the pressure within the vacuum chamber is changed from a first pressure value to a second pressure value while the motor is activated within the vacuum chamber.

In another embodiment, the invention provides an apparatus for measuring air contamination within a disc drive spindle motor fluid dynamic bearing. The apparatus comprising a means for rotating a disc drive motor and a means for detecting, during the rotation of the motor, at least one disc drive change as a function of air-contamination within the fluid dynamic bearing between at least a first and second atmospheric pressure on the fluid dynamic bearing by detecting change in fly height of a probe over a rotating surface within the disc drive.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
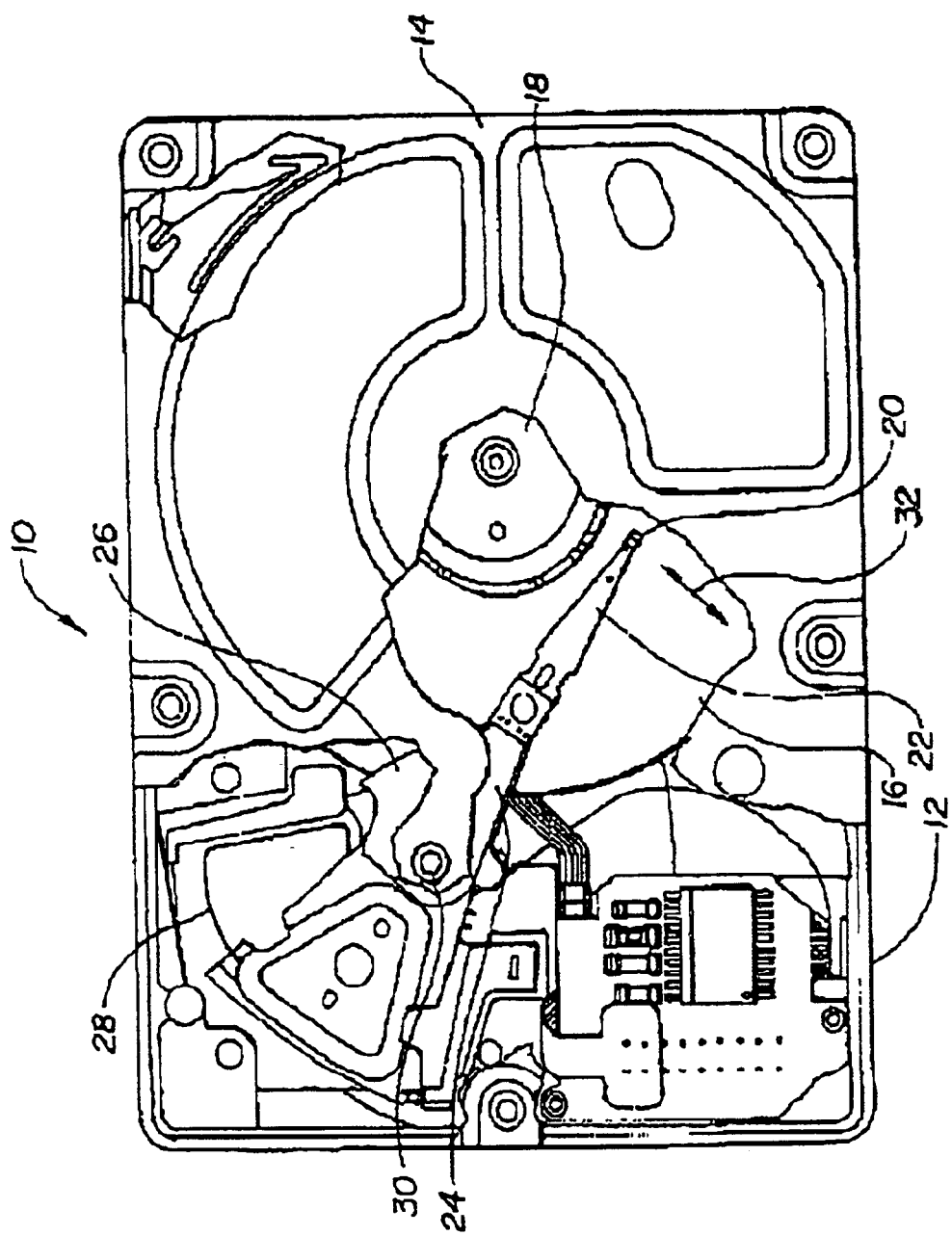
FIG. 1 depicts a plan view of one embodiment of a disc drive for use with aspects of the invention.

FIG. 1 depicts a plan view of one embodiment of a disc drive 10 for use with embodiments of the invention. Referring to FIG. 1, the disc drive 10 includes a housing base 12 and a top cover 14. The housing base 12 is combined with top cover 14 to form a sealed environment to protect the internal components from contamination by elements from outside the sealed environment. The base and top cover arrangement shown in FIG. 1 is well known in the industry. However, other arrangements of the housing components have been frequently used, and aspects of the invention are not limited to the configuration of the disc drive housing. For example, disc drives have been manufactured using a vertical split between two housing members. In such drives, that portion of the housing half which connects to the lower end of the spindle motor is analogous to base 12, while the opposite side of the same housing member, which is connected to or adjacent the top of the spindle motor, is functionally the same as the top cover 14. The disc drive further includes a disc pack 16 which is mounted for rotation on a spindle motor (not shown) by a disc clamp 18. Disc pack 16 includes one or a plurality of individual discs that are mounted for co-rotation about a central axis. Each disc surface has an associated read/write head 20 which is mounted to disc drive 10 for communicating with the disc surface. In the example shown in FIG. 1, read/write heads 20 are supported by flexures 22 which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached read/write heads 20 about a pivot shaft 30 to position read/write heads 20 over a desired data track along a path 32. While a rotary actuator is shown in FIG. 1, the invention may be used with other disc drives having other types of actuators, such as linear actuators.

Figure 2:
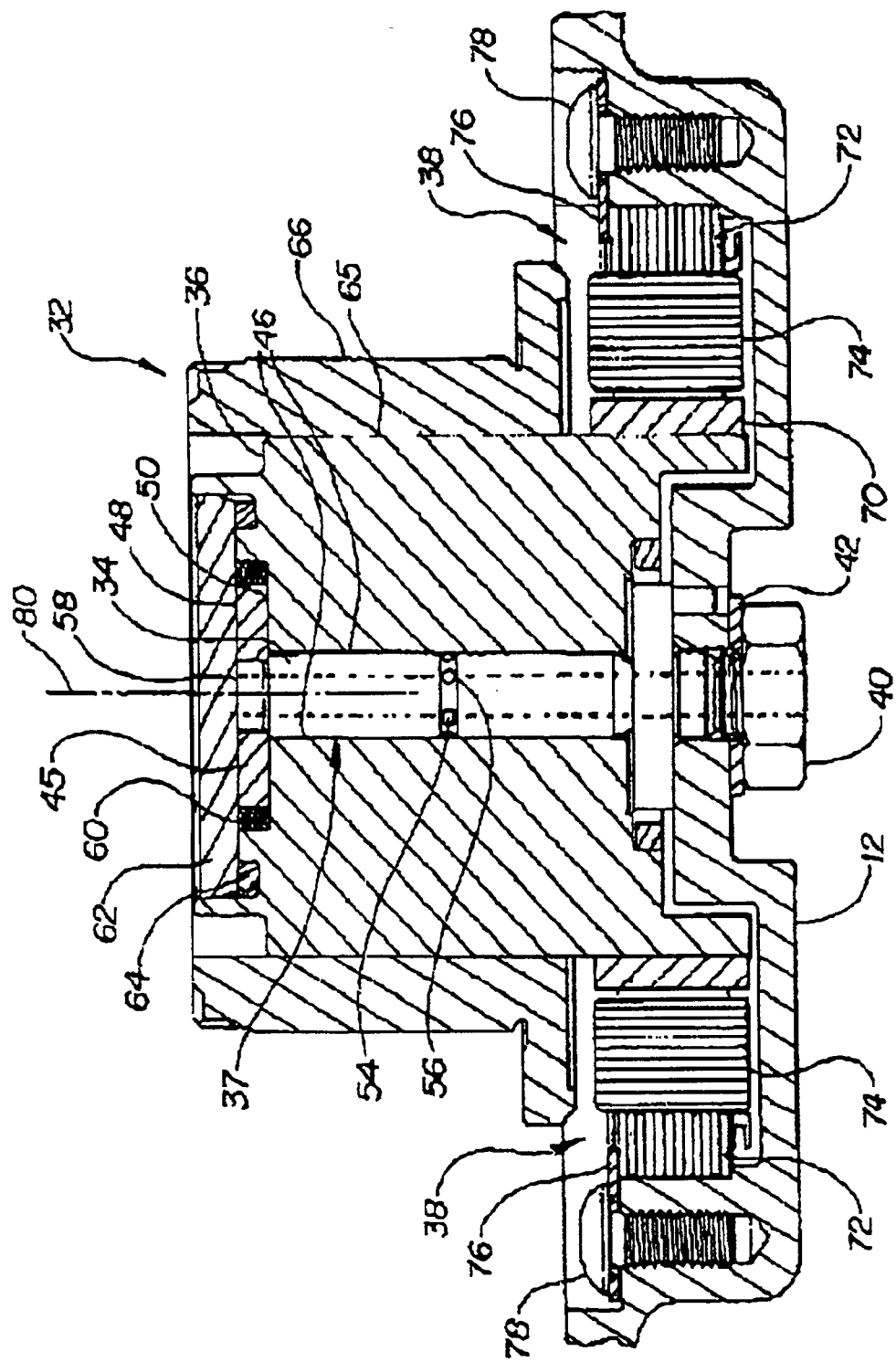
FIG. 2 is a sectional side view depicting one embodiment of a spindle motor for use with aspects of the invention.

FIG. 2 is a sectional view of a fluid dynamic bearing spindle motor 32 in accordance with the invention. Spindle motor 32 includes a stationary member 34, a hub 36, and a stator 38. In the embodiment shown in FIG. 2, the stationary member is a shaft that is fixed and attached to base 12 through a nut 40 and a washer 42. Hub 36 is interconnected with shaft 34 through a fluid dynamic bearing 37 for rotation about shaft 34. Fluid dynamic bearing 37 includes a radial working surface 46 (e.g., journal surface) and axial working surfaces 48 and 50 (e.g., thrust surface). Shaft 34 includes fluid ports 54, 56, and 58 which supply hydrodynamic fluid 60 and assist in circulating the fluid along the working surfaces of the fluid dynamic bearing 37. The fluid dynamic bearing 37 may include a series of hydrodynamic grooves 35 positioned thereon. The hydrodynamic grooves 35 may be disposed upon the shaft 34, and/or the hub 36 to facilitate the supply and distribution of the hydrodynamic fluid 60 to the radial and axial working surfaces 46–50, of the fluid dynamic bearing 37. The hydrodynamic grooves 35 may be configured any number of ways depending on the fluid dynamic bearing load requirements. For example, the hydrodynamic grooves 35 may include sinusoidal grooves, herringbone grooves, helix grooves, and other similar grooves. The spacing between the hydrodynamic grooves 35 is defined as the "land" 39 which may vary between the hydrodynamic grooves 35 to accommodate various fluid flow requirements. Hydrodynamic fluid 60 is supplied to shaft 34 by a fluid source (not shown), which is coupled to the interior of shaft 34 in a known manner. Spindle motor 32 further includes a thrust bearing 45, which forms the axial working surfaces 48 and 50 of fluid dynamic bearing 37. A counterplate 62 bears against working surface 48 to provide axial stability for the fluid dynamic bearing 37 and to position the hub 36 within spindle motor 32. An O-ring 64 is provided between counterplate 62 and hub 36 to seal the fluid dynamic bearing 37. The seal prevents hydrodynamic fluid 60 from escaping between counterplate 62 and hub 36. Hub 36 includes a central core 65 and a disc carrier member 66 which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for a spindle motor 32. Core 65 is formed of a magnetic material and acts as a back-iron for magnet 70. Rotor magnet 70 can be formed as a unitary, annular ring or can be formed of a plurality of individual magnets which are spaced about the periphery of hub 36. Rotor magnet 70 is magnetized to form one or more magnetic poles. Stator 38 is attached to base 12 and includes a magnetic field focusing member or lamination stack 72 and a stator winding 74. Stator winding 74 is attached to back-iron 72 between back-iron 72 and rotor magnet 70. Stator winding 74 is spaced radially from rotor magnet 70 to allow rotor magnet 70 and hub 36 to rotate about a central axis 80. Stator 38 is attached to base 12 through a known method such as one or more C-clamps 76 which are secured to the base through bolts 78. Commutation pulses applied to stator winding 74 generate a rotating magnetic field that communicates with rotor magnet 70 and causes hub 36 to rotate about central axis 80 on bearing 37. In the embodiment shown in FIG. 2A, spindle motor 32 is a "below-hub" type motor in which stator 38 is positioned below hub 36. Stator 38 also has a radial position that is external to hub 36, such that stator winding 74 is secured to an inner diameter surface 82 of lamination stack 72.

Figure 3A:
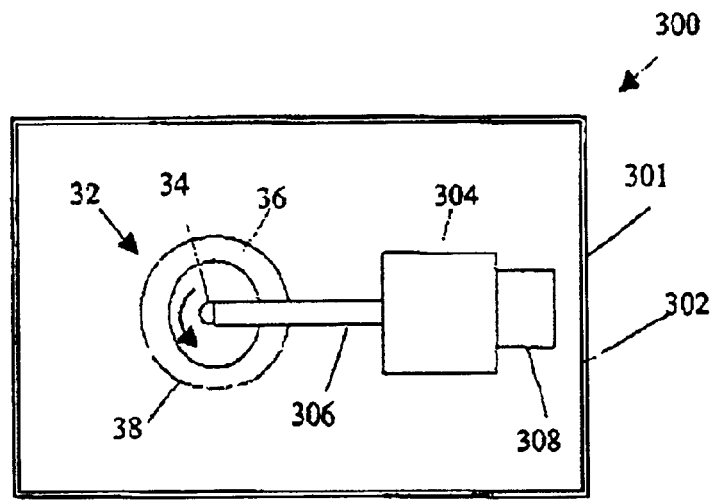
FIGS. 3A and 3B depict a plan view and top view of one embodiment of a testing apparatus for use with aspects of the invention.
Figure 3B:
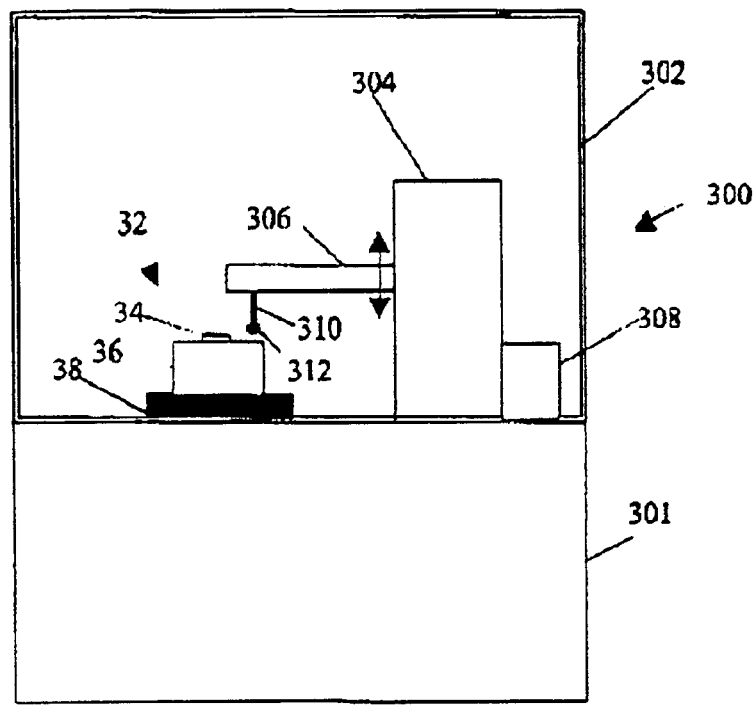

FIGS. 3A and 3B depict a simplified plan view and top view for one embodiment of an apparatus to detect air contamination in a fluid dynamic bearing 37 of a disc drive 10. FIGS. 1–2 are referenced as needed in the discussion of FIGS. 3A and 3B.

FIGS. 3A and 3B illustrate an air-detection apparatus 300 adapted to detect air-contamination in fluid dynamic bearings 37. The air-detection apparatus 300 includes a back-end system 301 configured to supply power and control signals to activate and/or control at least some of the operations of the disc drive 10. For example, the back-end system 301 may be adapted to provide power to the spindle motor 32. Further, while in one aspect the back-end system 301 includes a vacuum pump (not shown) to draw a vacuum within a vacuum chamber 302 disposed thereon, it also contemplated that the vacuum chamber 302 may be coupled to an external vacuum source to provide the vacuum within the vacuum chamber 302. The vacuum chamber 302 is configured to hold one or more assemblies such as the disc drive 10, spindle motor 32, and the like, therein to draw a vacuum therefrom.

In one aspect, the air-detection apparatus 300 includes an air-detection apparatus 304 disposed within the vacuum chamber 302. The air-detection apparatus 304 includes a moveable detection arm 306 having a detection probe 310 thereon. The detection probe 310 includes a surface detection tool 312 such as a capacitance probe, laser depth tool, ultrasonic depth finder, and other devices adapted to measure distances between the surface detection tool 312 and one or more surfaces of disc drive 10. In one aspect, the testing probe 310 detects the change in distance between the testing probe 310 and the hub 36. For example, if the distance between the surface detection tool 312 and hub 36 or standoff distance is 250 microns, the surface detection tool 312 and detects changes relative of about 50 microns. In one configuration, the air-detection apparatus 304 is coupled to a data processing system (not shown) to receive/transmit data with respect to the distance changes.

In one aspect of the invention, the data processing system may include a computer or other controller adapted to analyze and display distance changes between the surface detection tool 312 and one or more rotating surfaces of disc drive 10, and may display the data on an output device such as a computer monitor screen. In general, the data processing system may include a controller, such as programmable logic controller (PLC), computer, or other microprocessor-based controller. The data processing system may include a Central Processing Unit (CPU) in electrical communication with a memory, wherein the memory may contain an air-contamination detection program that, when executed by the CPU, provides support for controlling the air-detection apparatus 300. In another aspect of the invention, the data processing system may provide control signals to the disc drive 10 as part of the process of measuring the air-contamination of the fluid dynamic bearings 37. The air-contamination detection program may conform to any one of a number of different programming languages. For example, the program code can be written in PLC code (e.g., ladder logic), C, C++, BASIC, Pascal, or a number of other languages.

Figure 4:
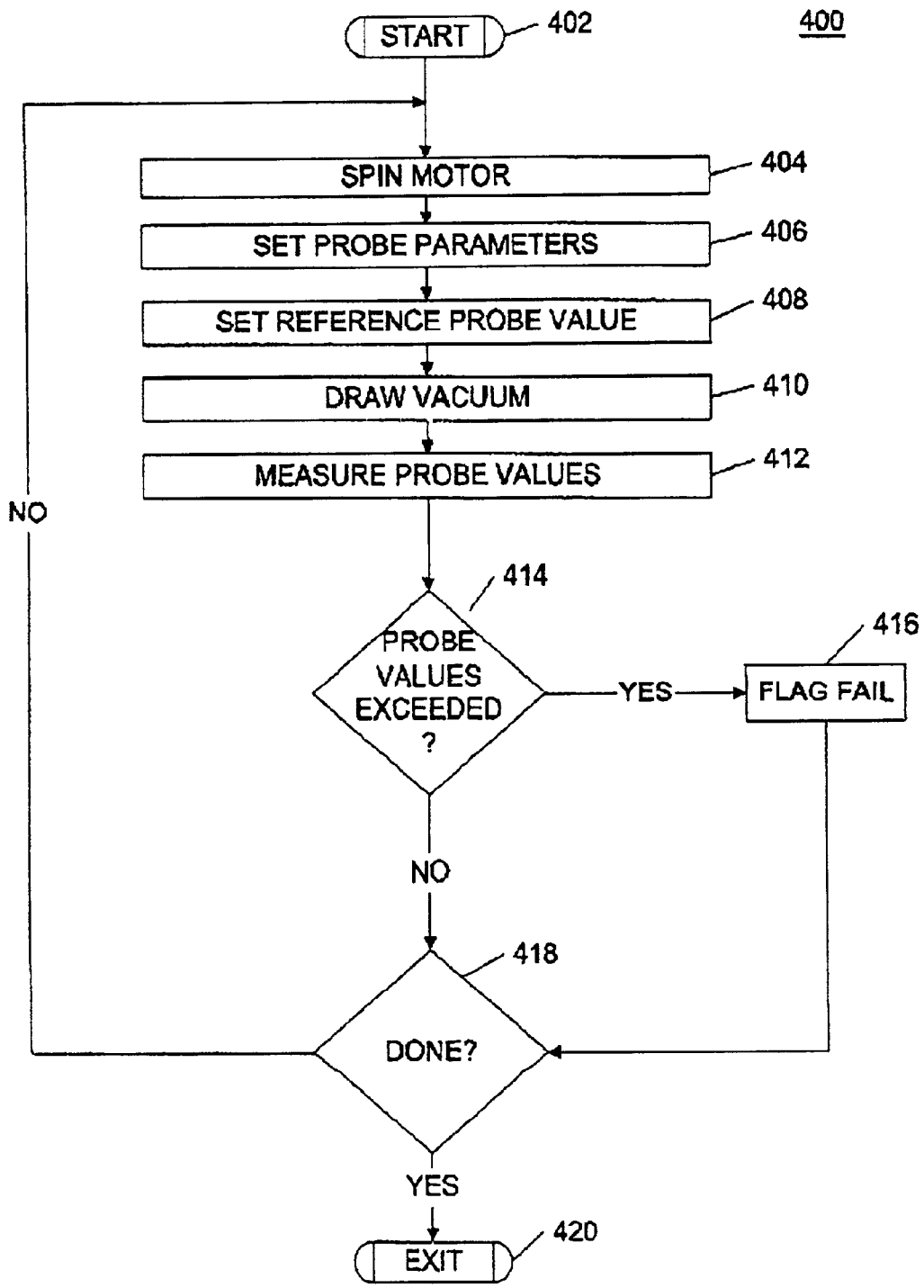
FIG. 4 depicts one embodiment of a method for determining air contamination for use with aspects of the invention.

FIG. 4 depicts a flow diagram of a method 400 to detect air-contamination within fluid dynamic bearings 37. FIGS. 1–3 are referenced as needed with the discussion of FIG. 4. Specifically, the method 400 starts at step 402 when a measurement process is, for example, initiated by a user activating an air-detection apparatus 304 configured to detect air-contamination within a fluid dynamic bearing 37. At step 404 the testing probe 310 is positioned a desired distance with respect to a disc drive 10 disposed within the vacuum chamber 302 and a rotating surface such as the spindle motor 32. In one configuration the spindle motor 32 is activated to rotate at a desired RPM between about 4200 and 10000, depending primarily on the working speed at which the disc operates.

At step 406, the detection probe 310 is configured to establish the threshold levels for detecting air-contamination using parameters such as sample rate, sensitivity, and other factors required to operate the detection probe 310. For example, a critical proximity change value between a spinning rotor 36 or a disc surface and a reference distance may be set as a threshold to flag the process controller of air-contamination within the fluid dynamic bearing 37. At step 408, the method 400 sets at least one reference distance between the surface being detected, and the detection probe 310, under given atmospheric pressure levels within the vacuum chamber 302, such as ambient air pressure. It is contemplated, the reference distance may be established any number of ways including, an RMS value of a plurality of detected distance values, a least squares regression model, and the like. Once the reference distance is stored, a vacuum of between about 1–500 Torr is pulled within the vacuum chamber 301 at step 410. In one aspect, the method 400 operates the back-end 310 to establish a vacuum within the vacuum chamber 301.

At step 412, the method measures the change in one or more probe measurement values. In one aspect, the change in distance between the detection probe 310 and a rotating hub 36 is measured. As air-contamination within the hydrodynamic fluid 60 increases, the greater the deflection between the detection probe 310 and the rotating hub 36 as the volume of air expands within the hydrodynamic fluid 60. At step 414, the method 400 compares the amount of measured deflection to the reference value and to acceptable threshold values. If the changes in hub deflection do not exceed the reference and/or threshold values, the method 400 proceeds to step 418 described below. If the changes in hub deflection exceed the reference and/or threshold values, the method 400 proceeds to step 416 to issue a message, such as a failure message to the process controller, for example. At step 418, the method 400 determines if the detection process is complete. If the detection process is complete, the method 400 proceeds to step 420 and exits. However, if the detection process is not complete, the method returns to step 404.

While the foregoing is directed to embodiments of the invention, other and further embodiments of the invention may be devised without departing from the scope thereof, and the scope thereof is determined by the claims that follow. For example, the first could be made at a higher than atmospheric pressure, and the second at atmospheric pressure. Alternatively, the two measurements could be made at two artificial pressures.

Other variations may be adopted by those of skill in the art.

What is claimed is:

1. A disc drive fluid dynamic bearing air contamination testing apparatus, comprising:
   a vacuum chamber adapted to hold at least one disc drive having a fluid dynamic bearing therein; and
   a detection apparatus adapted to detect at least one disc drive operational parameter change associated with air contamination of the fluid dynamic bearing when the pressure within the vacuum chamber is changed from a first pressure value to a second pressure value while the disc drive is activated within the vacuum chamber.

2. The apparatus of claim 1, wherein the detection apparatus comprises a probe adapted to measure a proximity between the probe and at least one rotating surface of the disc drive.

3. The apparatus of claim 2, wherein the at least one rotating surface of the disc drive comprises one of a hub, a motor, or a disc pack.

4. The apparatus of claim 2, wherein the probe comprises a capacitance probe adapted to measure the proximity between the probe and the at least one rotating surface of the disc drive.

5. The apparatus of claim 1, wherein the detection apparatus comprises a detection tool adapted to measure the at least one operational parameter at the first and second values.

6. The apparatus of claim 5, wherein the detection tool comprises a capacitance probe.

7. The apparatus of claim 5, wherein the detection tool comprises a laser.

* * * * *